(12) United States Patent
Ornberg

(10) Patent No.: US 6,182,722 B1
(45) Date of Patent: Feb. 6, 2001

(54) SAW ASSEMBLY

(75) Inventor: Rolf Ornberg, Röka (SE)

(73) Assignee: Hultdin System AB, Mala (SE)

( * ) Notice: Under 35 U.S.C. 154(b), the term of this patent shall be extended for 0 days.

(21) Appl. No.: 09/424,261

(22) PCT Filed: May 22, 1998

(86) PCT No.: PCT/SE98/00962

§ 371 Date: Nov. 19, 1999

§ 102(e) Date: Nov. 19, 1999

(87) PCT Pub. No.: WO98/53667

PCT Pub. Date: Dec. 3, 1998

(30) Foreign Application Priority Data

May 29, 1997 (SE) .................................................. 9702023

(51) Int. Cl.[7] ........................ A01G 23/019; A01G 23/08; B27B 17/00
(52) U.S. Cl. ............................. 144/34.1; 30/123.4; 83/72; 83/169
(58) Field of Search ................................. 30/123.4; 83/72, 83/73, 74, 75, 169, 368, 369, 370, 928; 144/4.1, 4.8, 24.13, 335, 336, 337, 356, 357

(56) References Cited

U.S. PATENT DOCUMENTS

| 3,720,247 | * | 3/1973 | Lindblom | 144/4.1 |
|---|---|---|---|---|
| 4,169,173 | * | 9/1979 | Bergholm et al. | 144/4.8 |
| 4,250,935 | * | 2/1981 | Helgesson et al. | 144/357 |
| 5,097,881 | | 3/1992 | Mack | 144/356 |
| 5,143,131 | * | 9/1992 | Seigneur et al. | 144/4.8 |
| 5,564,484 | * | 10/1996 | Ketonen | 144/4.8 |
| 5,845,402 | * | 12/1998 | Leini | 30/123.4 |

FOREIGN PATENT DOCUMENTS

| WO 93/23218 | 11/1993 | (WO) . |
|---|---|---|
| WO 95/27599 | 10/1995 | (WO) . |

* cited by examiner

Primary Examiner—W. Donald Bray
(74) Attorney, Agent, or Firm—Nixon & Vanderhye P.C.

(57) ABSTRACT

A saw assembly for a grip-harvester comprises a saw chain running around a bar, a pivotably journalled bar holder, and a liquid supply device having at least one nozzle for supplying at least one functional marking liquid to a cut surface produced during a sawing operation. The nozzle is mounted inside the saw box of the saw assembly and is fixed at a predetermined distance from a tree, measured at the saw cut to be executed. The nozzle is so directed that a liquid jet encounters the bar at an acute angle $\alpha$(e.g. $\alpha=20-40°$) and is deflected in towards the cut surface via a space between the bar and the cut surface. A control device initiates the supply of a liquid jet when the bar has been inserted a predetermined distance into the tree.

20 Claims, 10 Drawing Sheets

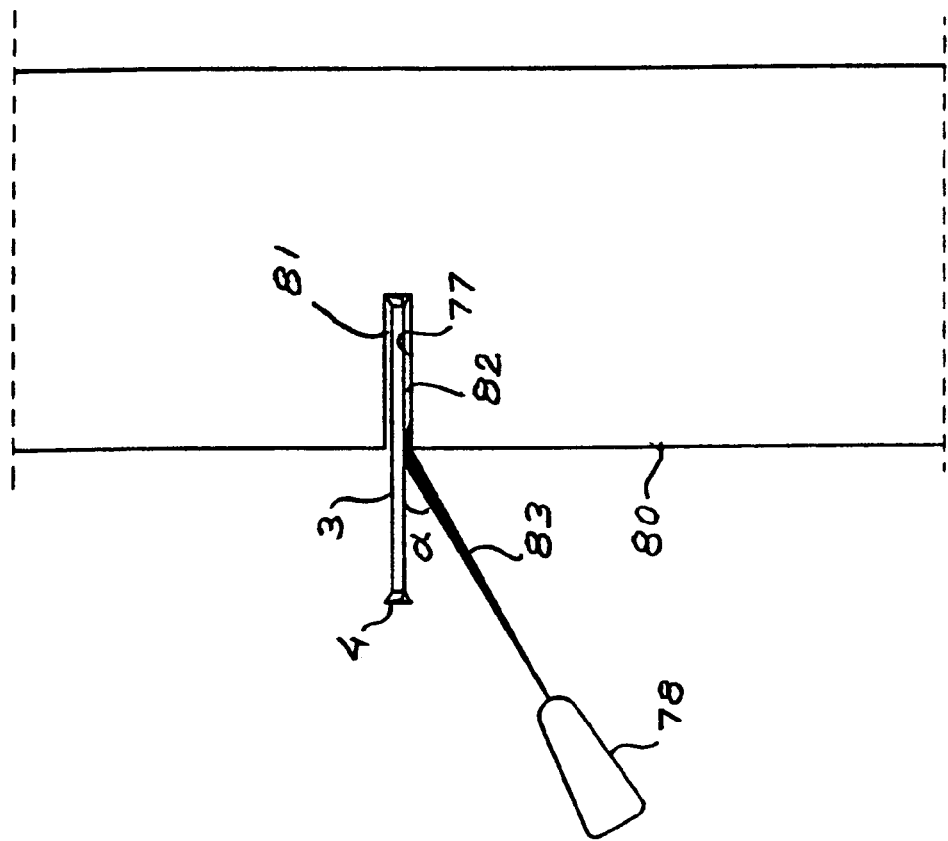

SAW ASSEMBLY

The present invention relates to a saw assembly for a grip-harvester, comprising a stand; a bar; a saw chain running around the bar and a chain sprocket; a bar holder pivotably journalled on the stand; a saw motor driving the chain sprocket; and a feeding-out and feeding-in device for feeding the bar out and in to perform a sawing operation, said feeding-out and feeding-in device comprising a hydraulic cylinder mounted on the stand and having a piston rod, and connection means to transmit the movements of the piston rod to the pivotable bar holder; a saw box in which the bar is mounted for feeding out of said box; and a liquid supply device for supplying at least one functional marking liquid to a cut surface produced during a sawing operation, which liquid supply device comprises at least one nozzle mounted with a holder and so directed that a liquid jet encounters an opposing side surface of the bar at an acute angle a and is deflected in towards the cut surface via a space between the bar and the cut surface.

Grip-harvesters are used to a great extent for mechanised felling of trees, and are equipped with hydraulically operated chain saws, generally designated saw assemblies. To achieve satisfactory operating results when using such saw assemblies it is particularly important that functions for chain tightening and lubrication of the saw chain are well developed and that certain other additional functions, such as tree marking and bar control, are also included in or in the vicinity of the saw assembly.

A grip-harvester is an implement with which a tree can be felled, the limbs removed and the felled tree cut into smaller pieces, the lengths of which are dependent on the purpose to which the sawn log shall be put. The grip-harvester comprises several main components, such as a rotator, a link system, a gripping unit with knives for cutting off limbs, a trunk-feeding device, a stand, a saw box and a saw assembly. The grip-harvester is preferably freely suspended via its rotator and link system from the tip of a forest crane which is in turn mounted on a vehicle designed for being driven in forest land and other rough terrain. The vehicle with crane and grip-harvester is used both for felling trees and at the same time removing the limbs and cutting the tree into shorter pieces. A method of operating known grip-harvesters with known equipment can be described as follows. The operator places the grip-harvester against the standing tree and manipulates the gripping claws to encompass the tree. The operator then activates the saw assembly so that the bar with saw chain swings out and cuts the tree at its lowermost part. During this phase and when the tree falls to the ground a urea liquid or the equivalent shall be applied to the upper surface of the remaining stump as efficiently as possible, without the cut surface of the cut tree being touched by the liquid.

When the tree has been felled, the operator applies the grip-harvester on the root end of the felled tree and initiates the feed function, whereupon the tree is fed towards the de-limbing knives so that the limbs around the trunk are cut off and removed from the trunk. While the tree is being fed along the operator also initiates feeding out the bar so that, when a suitable length of the trunk has been fed along, the bar will swing out and cut off the length of de-limbed trunk that has been fed along. The operator determines what is a suitable length depending on the desired use to which the log shall be put, e.g. if it is to be used as timber (sawn timber), pulp wood or for some other purpose. To enable the operator of a following machine, called a forwarder, to correctly sort the wood into timber, pulp and other types of cut pieces of wood when loading it, the operator of the grip-harvester must mark the surface of the logs with a colour stripe as they are cut from the original tree, different colours being used for the various types of logs cut, one colour for timber, another for pulp, etc.

The colour-marking liquid is applied to the cut surface of the cut log via a tank system on the grip-harvester or its carrier. One of the most usual methods of supplying the liquid is to spray it towards the cut surface of the cut log through a nozzle on the grip-harvester's stand. It is extremely important that the nozzle is aimed at the log in such a way that the liquid is sprayed on the middle of the cut surface and that the jet can be concentrated to produce a colour stripe across the surface. However, this entails considerable difficulty and the method is therefore not considered to be sufficiently efficient. Another known method of supplying the liquid is to spray it out through specially arranged channels in the bar, separate channels being arranged for each colour required. This method is more efficient since the liquid can be sprayed onto the surface of the cut log in the right place and also automatically forms a colour stripe since the supply of colour can start when the bar is applied against the tree to be felled and can be discontinued when the bar has sawn off the log. However, the method entails a great increase in cost for the bar in comparison with a standard bar, as a result of the arrangement of the channels inside the bar. This method is therefore not appreciated by the users.

In all the methods of supplying liquid described above, start and stop signals for the supply of liquid are obtained with the aid of electronic signals from the electronic sensor system.

In mechanised felling and processing of trees in which grip-harvesters of the type described above are preferably used, it is necessary to be able to spray out various types of functional liquids on to the cut surface of the de-limbed and cut tree trunk at the time of sawing, in an automatic but reliable manner. When the tree has been felled it must be graded and processed. This marking, i.e. dividing into lengths, is performed with the aid of a marking computer in the harvester. Each log shall be marked by marking liquid being sprayed onto the cut surface of each individual log. Separate colours are used for the different grades or assortments to be separated. The equipment consists of a tank for the various coloured liquids, a pump and a spreader. The spreader on a harvester consists either of a special bar with pre-drilled channels for each colour and corresponding holes, or of a nozzle. In both cases the composition is sprayed over the end of the tree during the separation phase. The drawback of the special bar is that it is more expensive than standard bars, while the use of nozzles means that it may be difficult to obtain efficient marking since it may be difficult to set the correct spraying angle.

There is therefore a great need for some form of arrangement that enables efficient colour marking of logs, while still using standard bars.

The object of the present invention is to provide a device in a saw assembly of the type described in the introduction, which enables efficient supply of marking liquids for logs, using standard bars and eliminating current drawbacks with the use of nozzles.

The saw assembly according to the invention is characterized in that the nozzle with its holder is mounted inside the saw box, so that it is held at a fixed predetermined distance from the tree, measured at the start of the saw cut to be executed, when gripping claws are arranged to encompass the tree and press this against a free edge of a top plate of the saw box, and in that the saw assembly comprises a control means arranged to initiate supply of a liquid jet when the bar has been inserted a predetermined distance into the tree.

The invention will be described in more detail with reference to the drawings.

FIG. 10 shows schematically a nozzle in the saw assembly according to FIG. 7 and the deflection of the jet from the saw bar towards a cut surface during commencement of a sawing operation.

Figure 1:
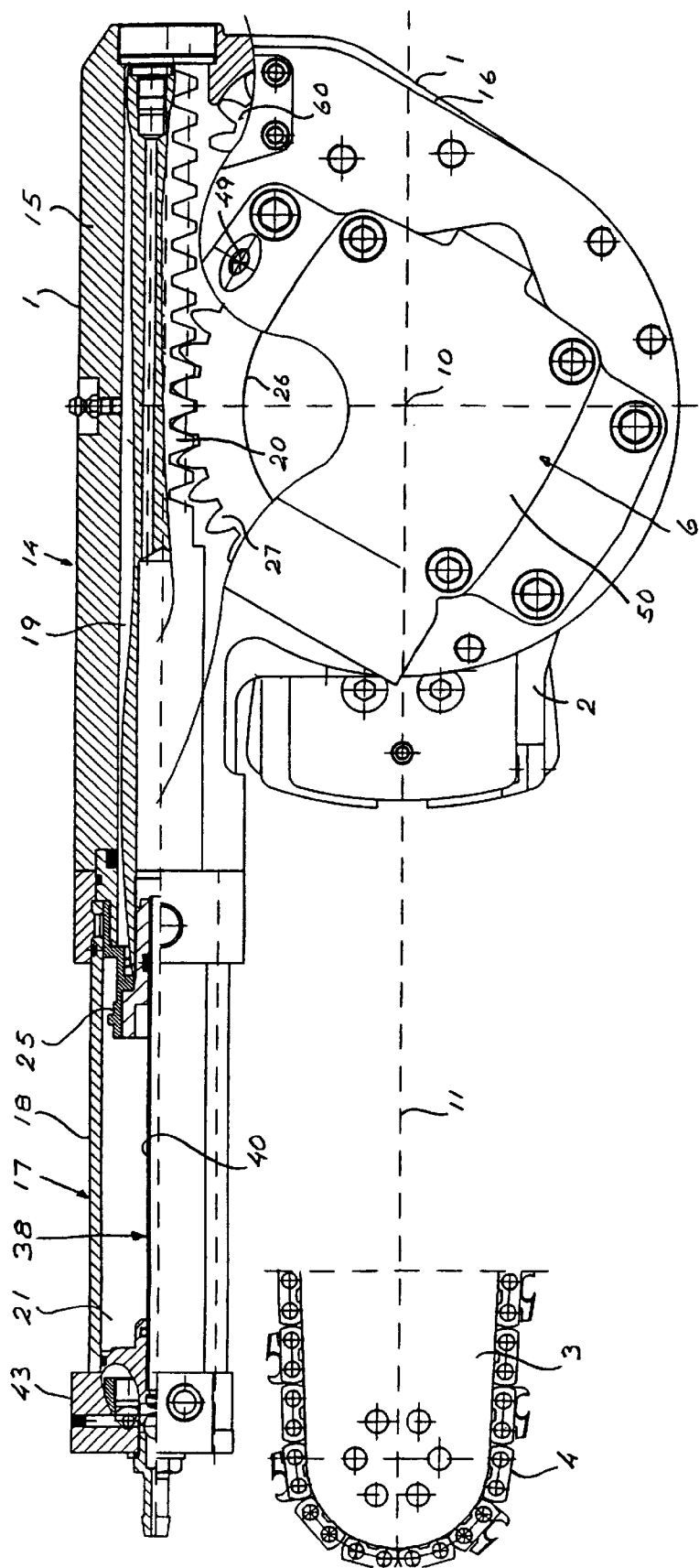
FIG. 1 shows schematically from above parts of a saw bar, partially in section.
Figure 2:
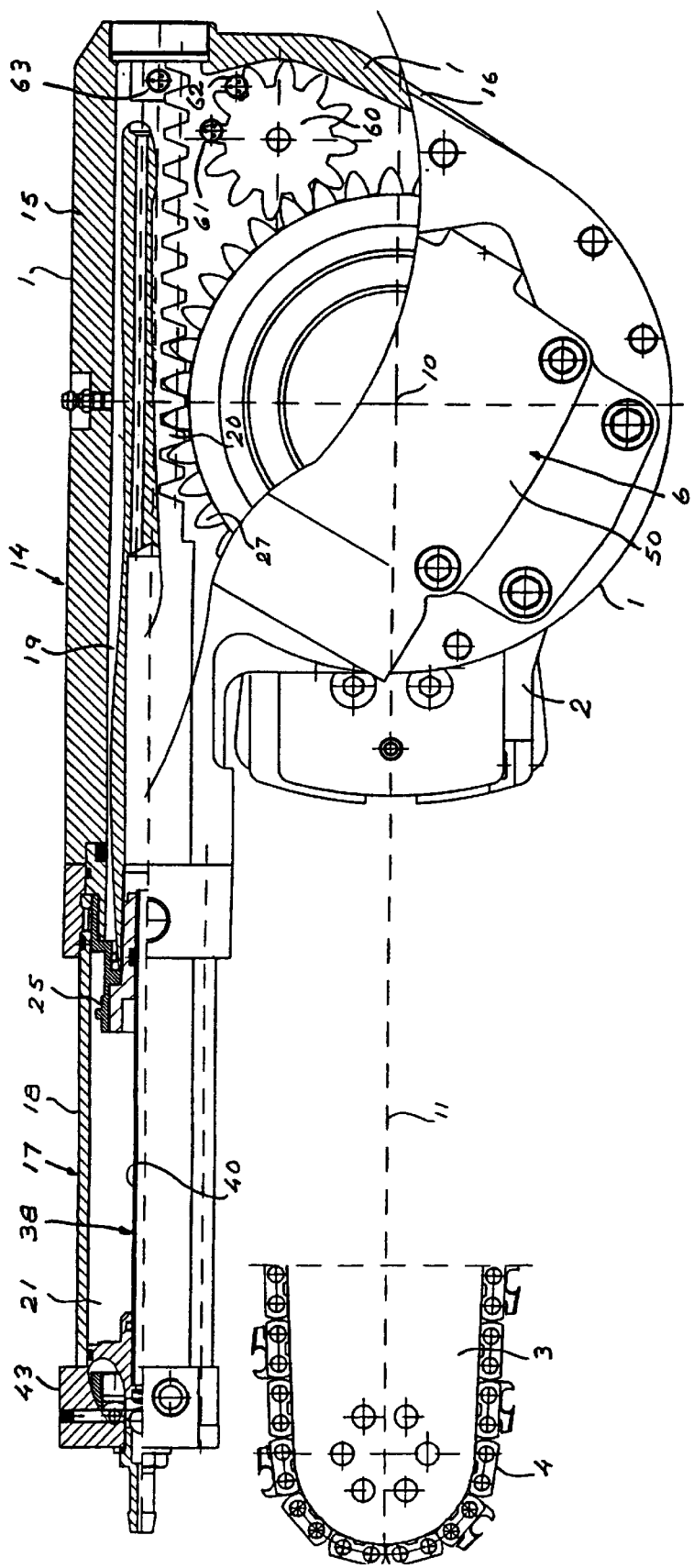
FIG. 2 shows the saw assembly according to FIG. 1 more in section.
Figure 3:
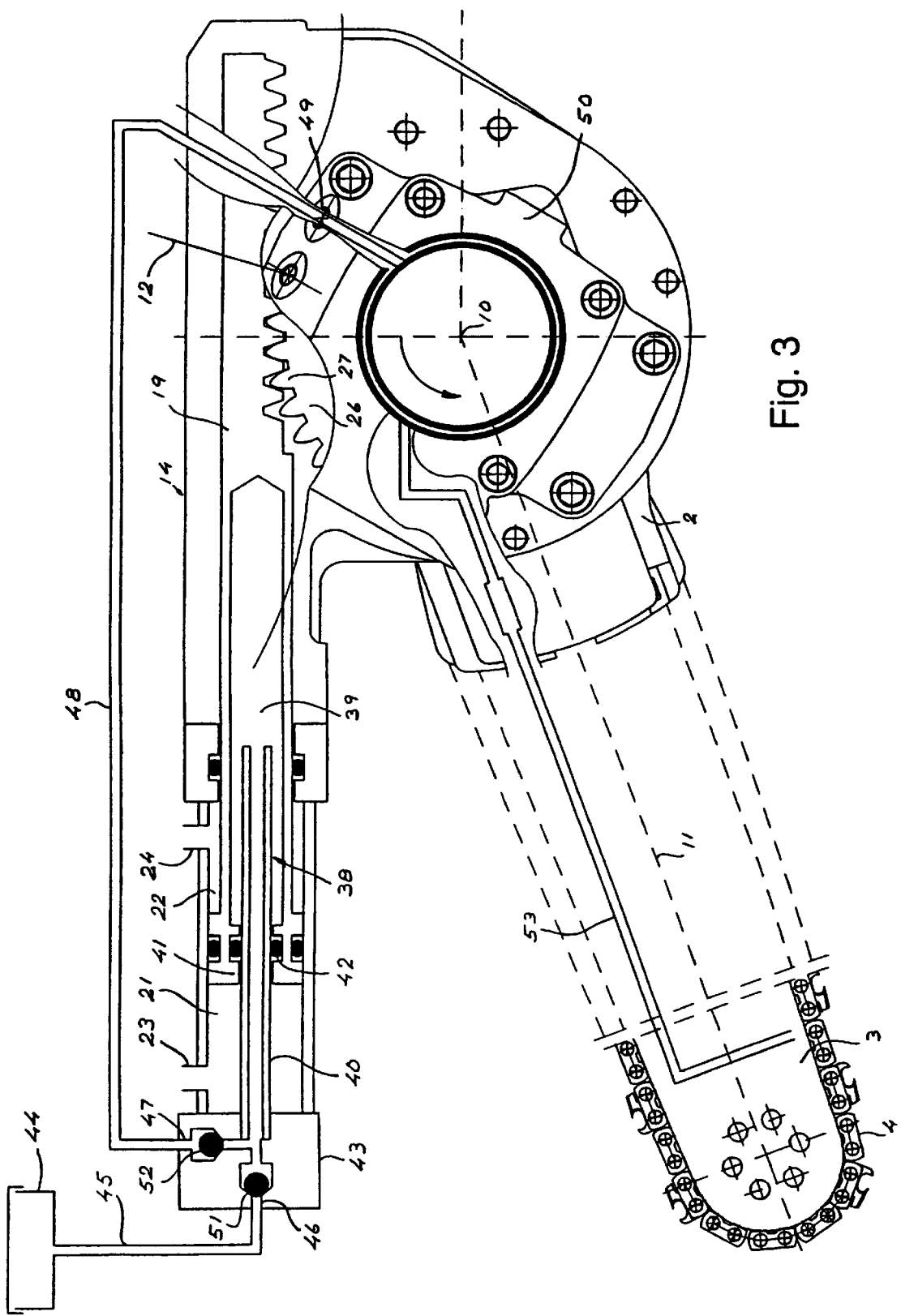
FIG. 3 shows the saw assembly according to FIG. 1 and illustrates its feeding-out and feeding-in device for the saw bar, and also a built-in lubricating oil pump.
Figure 4:
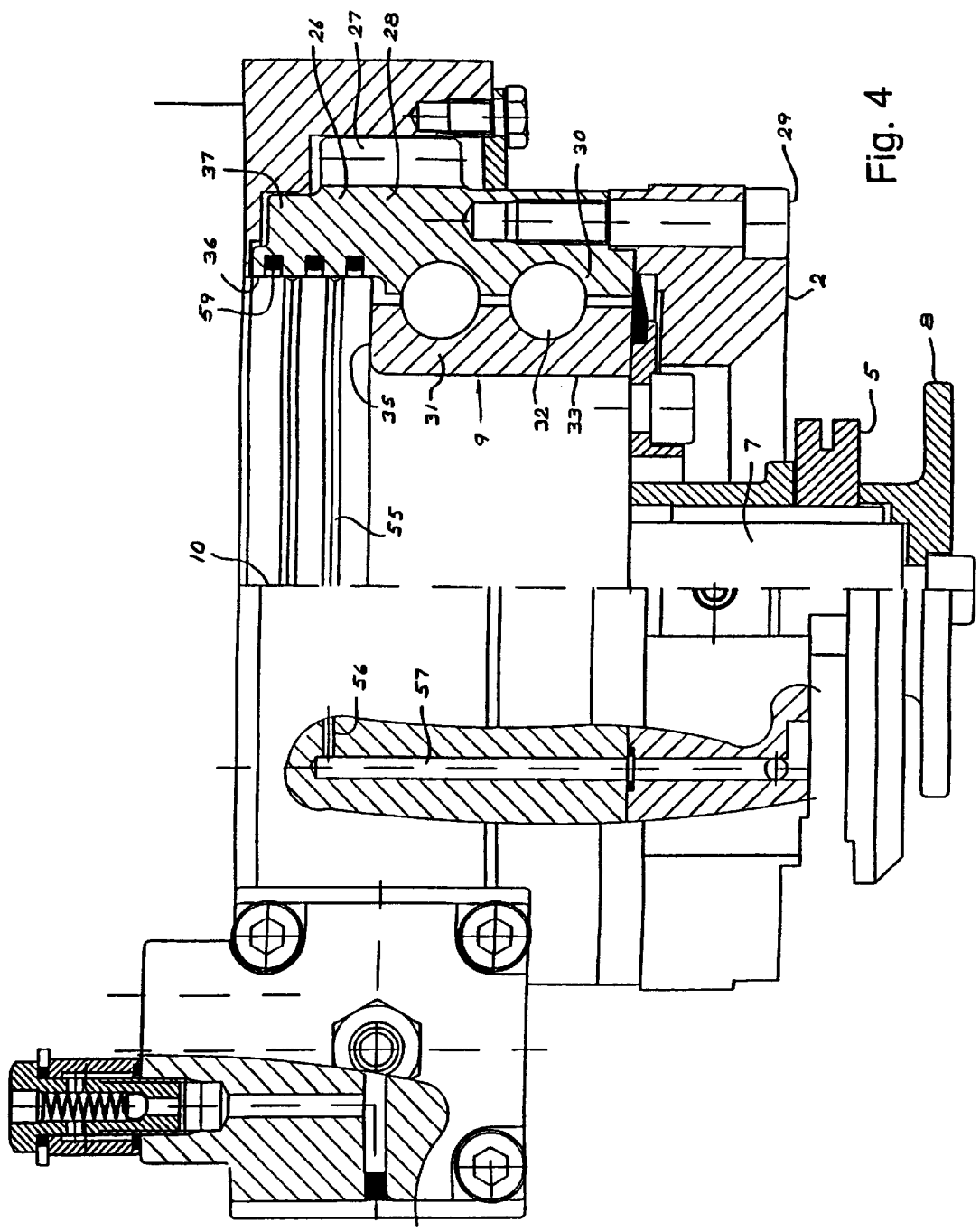
FIG. 4 is a view of the saw assembly according to FIG. 1 seen from one end, partially in section.
Figure 5:
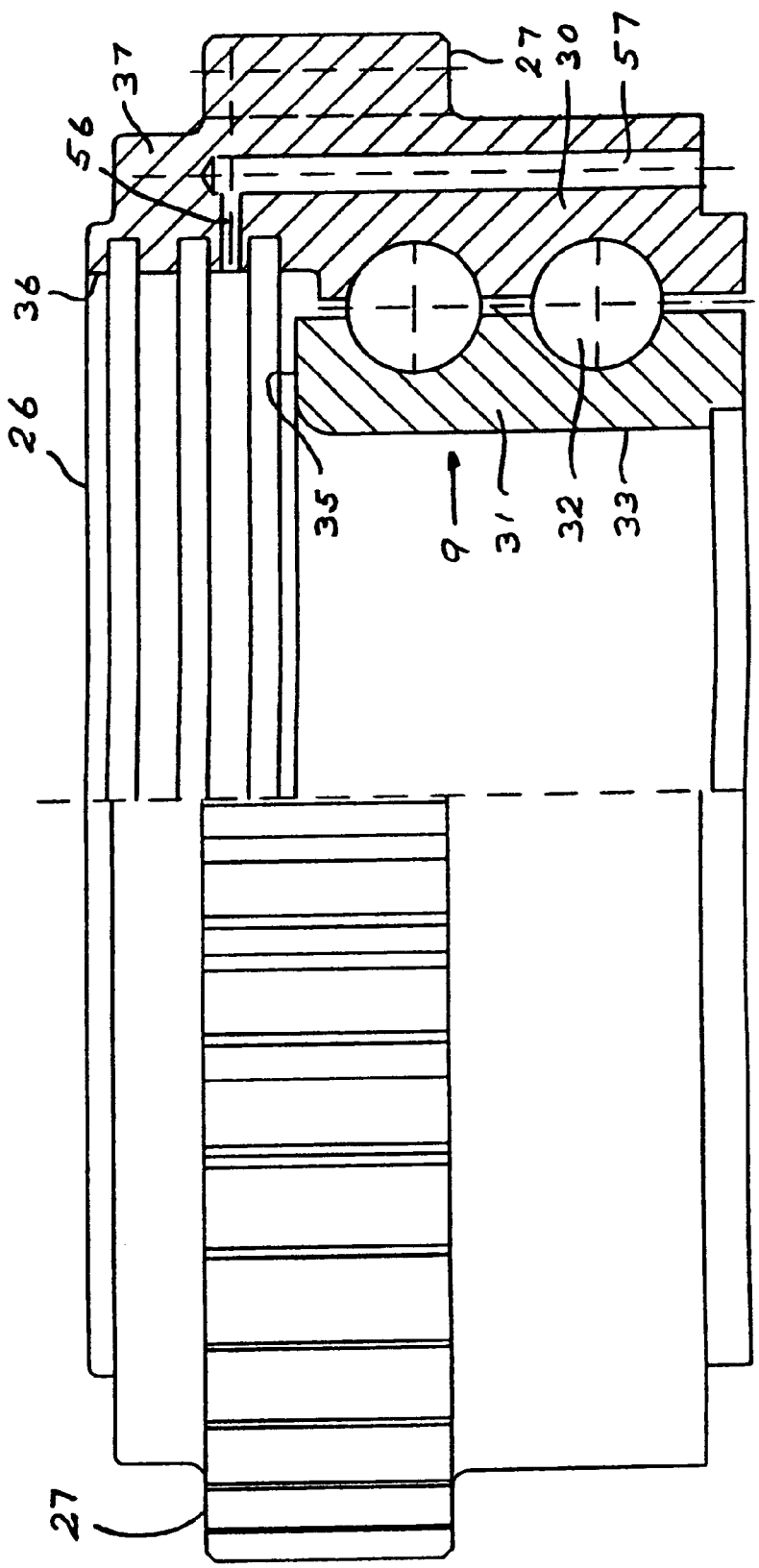
FIG. 5 is a side view of a toothed wheel and bearing means in the saw assembly according to FIG. 1, partially in section.
Figure 6:
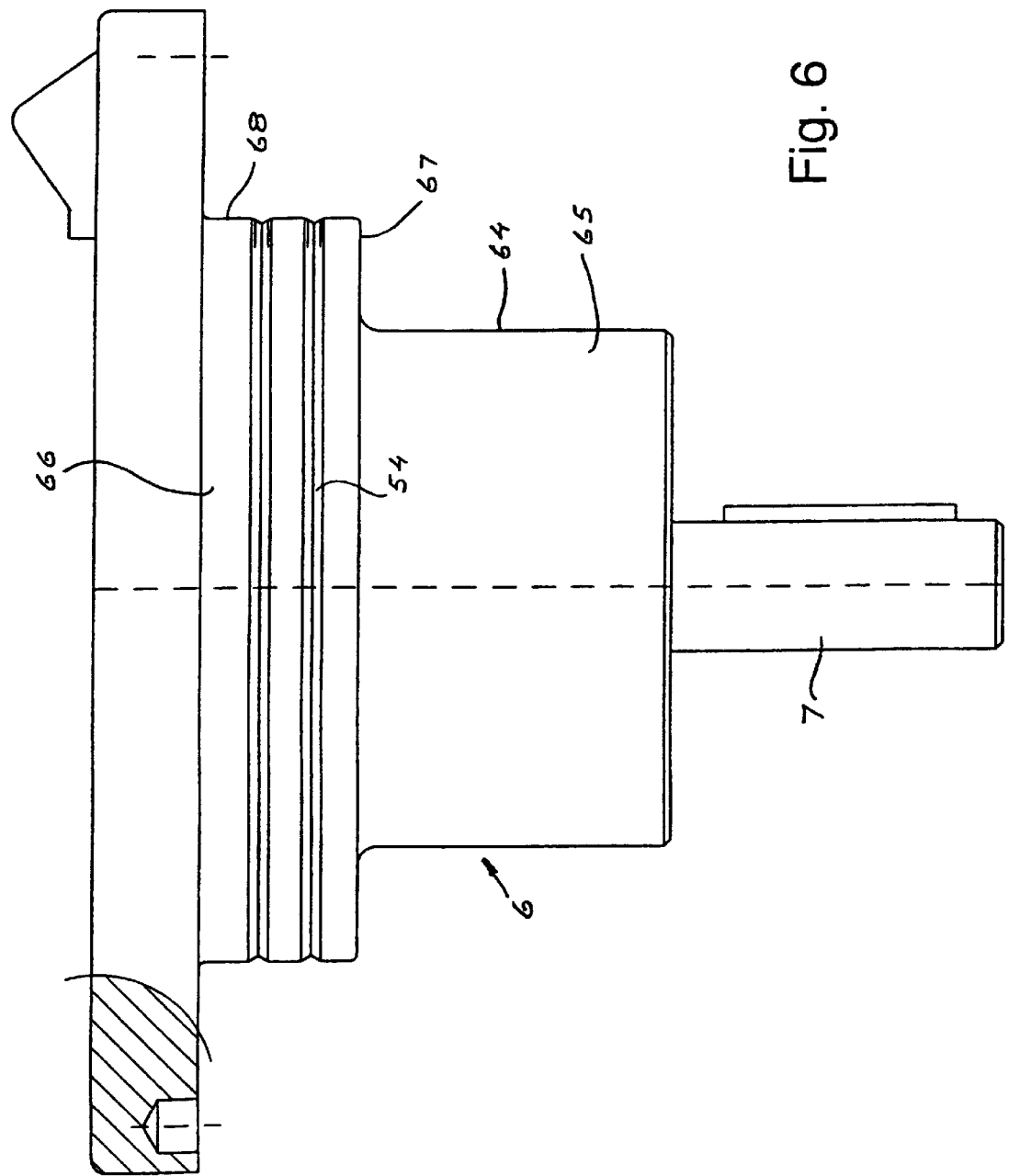
FIG. 6 shows a side view of a saw motor included in the saw assembly according to FIG. 1.
Figure 7:
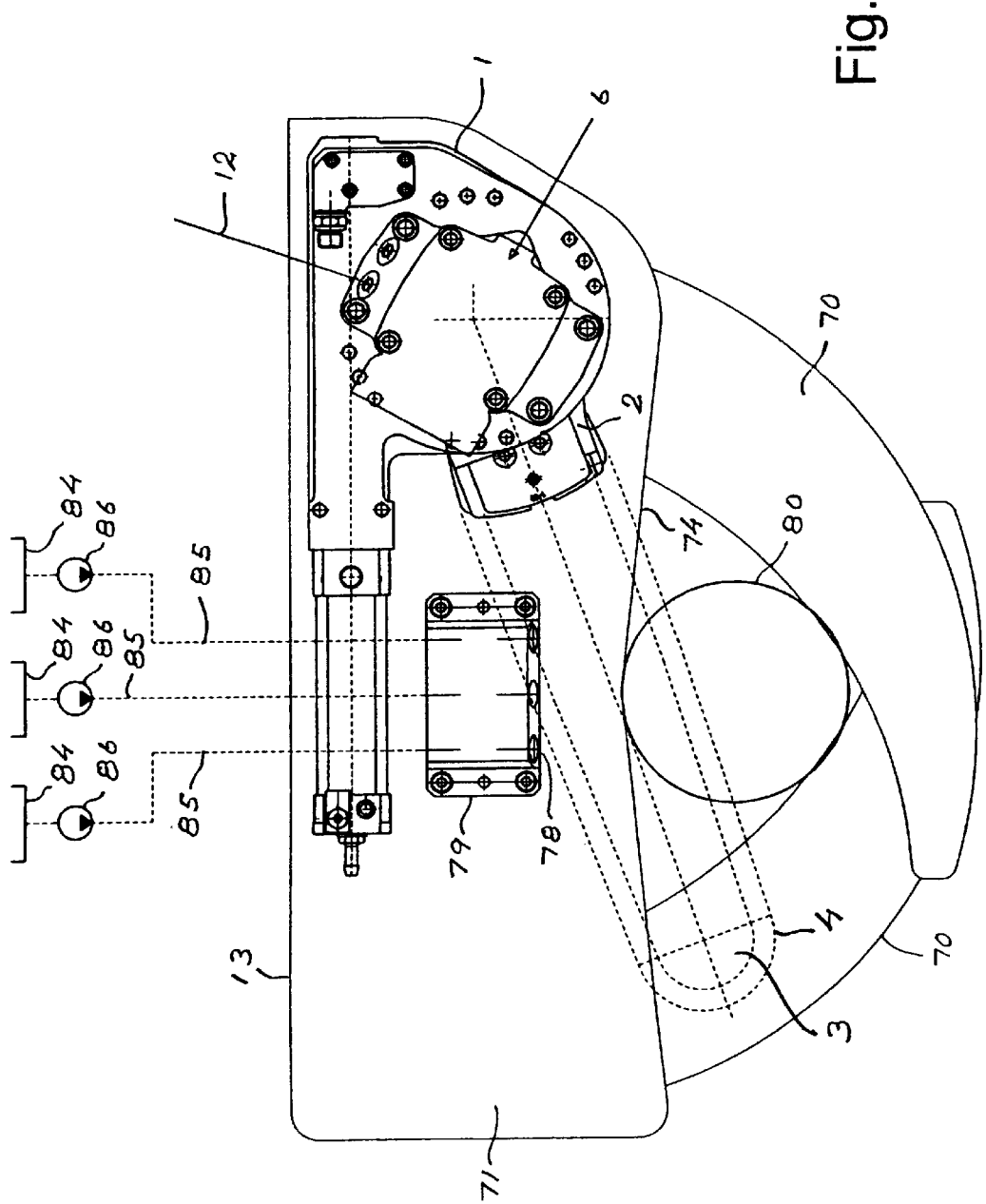
FIG. 7 is a top view of the saw assembly and a liquid supply device with nozzles directed towards the tree.
Figure 8:
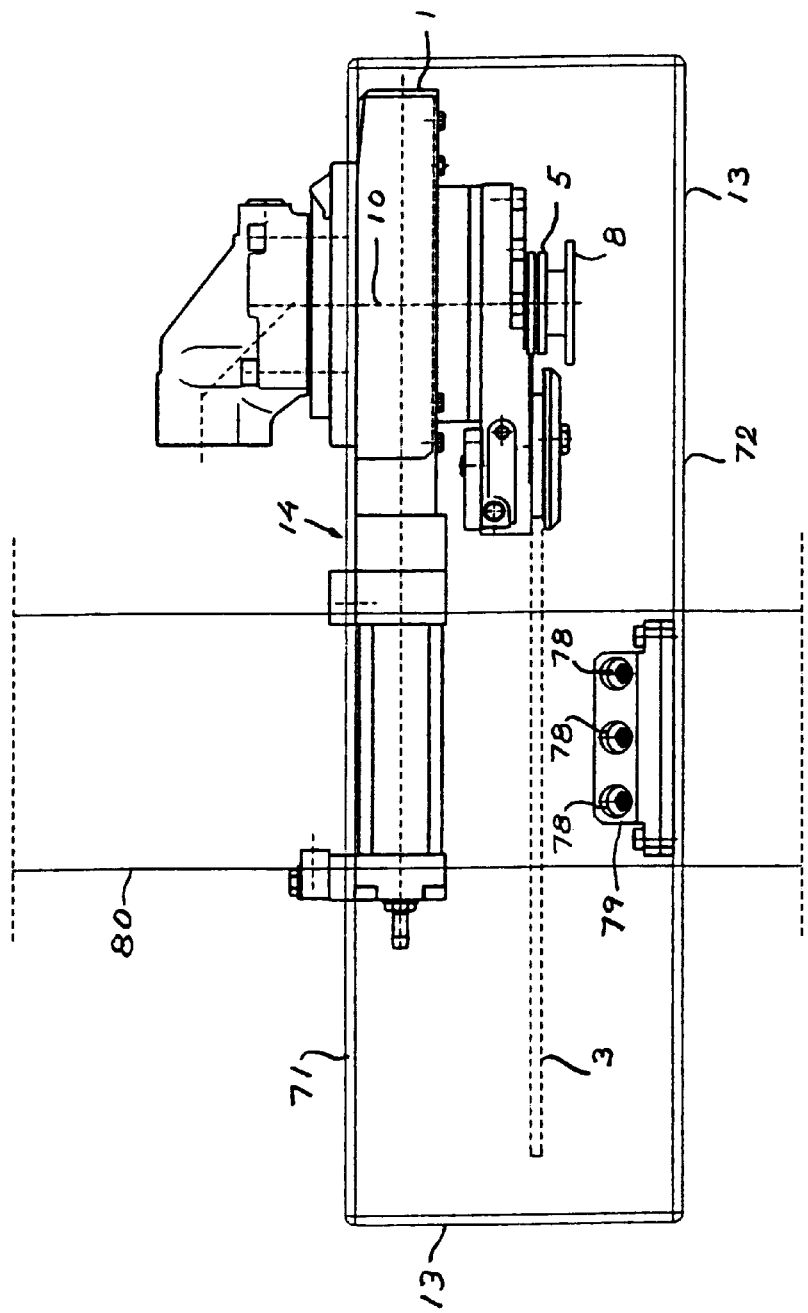
FIG. 8 shows the saw assembly according to FIG. 7 from the open side of a saw box in the saw assembly.
Figure 9:
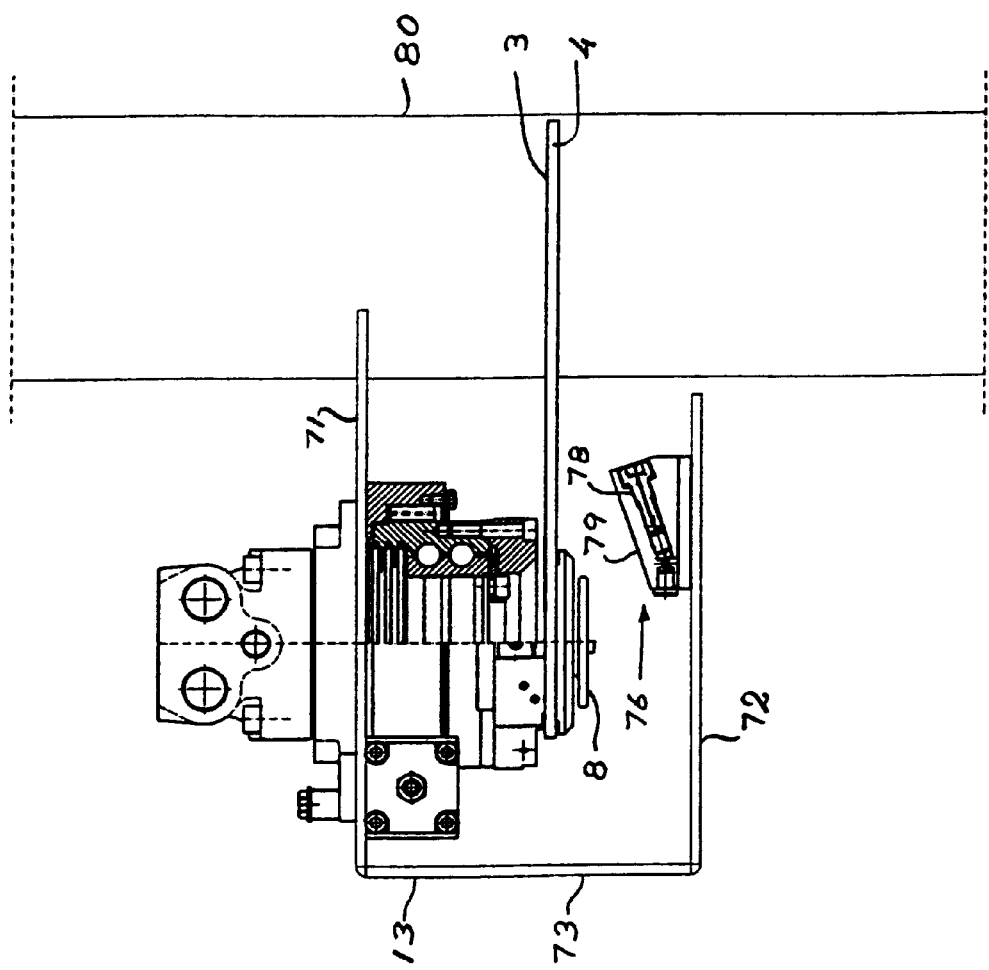
FIG. 9 is an end view of the saw assembly, partially in section, according to FIG. 8.

FIGS. 1–4 show schematically parts of a saw assembly comprising a saw box 13 intended for inclusion in a grip-harvester with cooperating gripping claws 70 (see FIG. 7). The saw assembly comprises a stand 1, a bar holder 2 and a bar 3 mounted on the bar holder 2 with the aid of suitable bar attachments and assembly devices so that a displaceable unit is formed including said bar 3. A saw chain 4 runs around the bar 3 and a chain sprocket 5 (see FIG. 4), which is driven by a saw motor 6 (see FIG. 6) via a drive shaft 7 (see FIG. 4) which also carries a chain guard 8. The saw motor 6 is rigidly secured inside the stand 1. The bar holder 2 is pivotably journalled in relation to the stand 1 by bearing means 9 (see FIG. 4), to be turned in controlled manner about an axis 10 coinciding with the central axis of the drive shaft 7 of the saw motor 6.

Said unit is thus mounted on the bar holder 2 so that the bar 3 can be displaced in relation to this in a direction corresponding to the longitudinal centre line 11 of the bar 3 and which is perpendicular to said axis of pivot 10. A first hydraulic piston cylinder (not shown) is arranged in one of said bar attachments to be activated by a hydraulic circuit system of the saw assembly via a directional valve and a connection comprising an outer pipe 12 (see FIG. 3) for displacement of the unit in relation to the bar holder 2 so that, during operation of the saw assembly, the bar 3 in the unit automatically keeps the saw chain 4 taut. A second hydraulic piston cylinder (not shown) is arranged in one of the bar attachments to act in parallel with the axis of pivot 10 in order to press against the bar holder 2 in a controlled manner to flexibly secure the movable unit to the bar holder 2. The other piston cylinder is also affected by the pressure in said hydraulic circuit system via said outer pipe 12.

The saw assembly comprises a device 14 for controlled feeding of the bar 3 out and in by turning the bar holder 2 about the axis of pivot 10. The stand comprises an oblong side part 15, situated tangentially in relation to the central stand part 16, in which the saw motor 6 is situated. The feeding-out and feeding-in device 14 comprises a hydraulic cylinder 17 which is coaxially rigidly mounted on one end of the oblong stand side part 15. The piston cylinder 18 of the hydraulic cylinder is situated behind the bar 3, seen in its direction of movement, and parallel to the bar 3 when this is in its initial position prior to a sawing operation. The piston rod 19 of the hydraulic cylinder is situated in the stand side part 15 and is shaped as a rack, its side facing the axis of pivot 10 being provided with a section having a plurality of teeth 20—twelve teeth in the embodiment shown. Hydraulic fluid is supplied to and removed from the two pressure chambers 21, 22 (see FIG. 3) of the piston cylinder 18 via pipes 23, 24 connected to the hydraulic circuit system of the saw assembly via a directional valve (not shown), which pressure chambers 21, 22 are defined by a piston 25 carried by the rack 19. The feeding-out and feeding-in device 14 also comprises a toothed wheel 26 with a rim 27, with which the rack 19 of the hydraulic cylinder is in engagement. The toothed wheel 26 has a cylindrical body 28 (see FIG. 4) and is rigidly joined to the bar holder 2 to form a unit therewith which can be turned about said axis of pivot 10. The rigid connection is achieved by means of axial bolts 29 (see FIG. 4) which are screwed into the lower part of the toothed wheel body 28 and which extend through borings in the peripheral part of the bar holder 2. Said bearing means 9, which enables turning of the bar holder 2, is situated within the area, i.e. within the axial extension of the toothed wheel 26. The bearing means 9 consists of a ball bearing with an outer bearing ring 30 formed by the radially inner part of the toothed wheel 26, and an inner bearing ring 31 with which the saw motor 6 is joined to form a rigid unit, i.e. so that the inner bearing ring 31 cannot be turned about the axis of pivot 10. Between them the bearing rings 30, 31 carry balls 32 in two tracks, the ball races being out of round so that the ball bearing functions as a four-point bearing. The inner surface 33 of the inner bearing ring 31 is cylindrical and forms an assembly support for the corresponding externally cylindrical surface 64 of a longitudinally extending assembly shaft 65 of the saw motor 6 (see FIG. 6), the saw motor having an inner radial flange 66, the lower side 67 of which rests on the radially upper surface 35 of the inner bearing ring 31, and the peripheral axial surface 68 of which cooperates with an inner opposite axial surface 36 of the upper part 37 of the toothed wheel body 28.

The saw assembly also comprises a lubricating oil pump 38 (see FIG. 3), arranged to provide the saw chain 4 with lubricating oil when the bar 3 is fed out. In the embodiment shown the lubricating oil pump is built into the hydraulic cylinder 17 itself in order to form an integrated unit therewith and be served thereby. The lubricating oil pump 38 comprises a central, longitudinally extending pump chamber 39 (see FIG. 3) inside the rack 19 in the part facing the piston cylinder 18, and also a central pipe 40 extending through the piston cylinder 18 and into said pump chamber 39 so that one end is always situated in the pump chamber 39. The pump chamber 39 is closed off from the pressure chamber 21 of the hydraulic cylinder 17 by means of suitable sealing elements 41 comprising a sealing ring 42. The hydraulic cylinder 17 is closed at the end facing away from the piston rod 19 by means of a valve housing 43 in which said central pipe 40 extends for rigid assembly therein. The pump chamber 39 is supplied with lubricating oil from a lubricating oil tank 44 (see FIG. 3) via an outer pipe 45, a first channel 46 in the valve housing 43 and the central pipe 40. Lubricating oil is pumped out from the pump chamber 39 via the central pipe 40, a second channel 47 in the valve housing 43 and an outer pipe 48 connected to an inlet 49 in the cover 50 of the saw motor. The first and second channels 46, 47 in the valve housing 43 are provided with non-return valves 51, 52, respectively. It will be understood that lubricant is pumped out of the pump chamber 39 when the rack 19 is moved towards the valve housing 43 in order to commence a sawing operation, the volume of the pump chamber 39 decreasing as a result of a larger part of the central pipe 40 being located within the pump chamber 39. When the saw bar 3 is returned by the rack 19 being moved in the opposite direction, the volume in the pump chamber 39 increases to a corresponding degree since a smaller part of the central pipe 40 will be located within the pump chamber 39. Due to the partial pressure now arising in the pump chamber 39 the lubricant will be sucked into the pump chamber 39 from the lubricating oil tank 44 via pipe 45, channel 46 with its opened non-return valve 51 and the central pipe 40.

From the inlet 49 the lubricant is conveyed to the saw chain 4 via connections in the saw motor 6, toothed wheel 26, holder 2 and a conduit 53 having its orifice close to the saw chain 4. Said connections comprise a circular channel formed by opposing grooves 54, 55 in the flange of the saw motor 6 and the toothed wheel 26, a channel (not shown) in the saw motor 6, which connects said inlet 49 with said circular channel, and radial and axial channels 56, 57 which connect the circular channel 54 with said conduit 53 with its orifice close to the saw chain 4.

Between them the flange of the saw motor 6 and the toothed wheel 26 define a second similar circular channel in order to provide said hydraulic piston cylinders with pressure oil via similar axial and horizontal channels in the saw motor 6, toothed wheel 26 and holder 2 from an inlet 49 in the motor cover 50. The circular channels are sealed by means of sealing rings 59 inserted in peripheral grooves.

The saw assembly also comprises a special device for sensing and recording the angular position and also, in the embodiment shown, the direction of movement of the saw bar 3 in relation to its home position. This device comprises a small toothed wheel 60 (see FIG. 2) which is in toothed engagement with the toothed wheel 26 of the feeding-out and feeding-in device 14 and two sensors 61, 62 one of which, in the starting position of the saw bar 3, is situated immediately opposite a gap between two teeth, whereas the other is situated immediately opposite a tooth. The small toothed wheel 60 is considerably smaller than the toothed wheel 26 of the feeding-out and feeding-in device 14 so that a large gear ratio is obtained which, in the embodiment shown, is 3.25:1. A slight rotation of the saw bar 3 thus gives a large movement on the small toothed wheel 60, which movement is sensed by the sensors 61, 62. These sensors create pulse trains which are recorded and processed by a computer. The arrangement with two toothed wheels 26, 60 with large gear ratio and sensors 61, 62 enables extremely small angular movements of the holder 2 to be recorded, i.e. angular movements of 2°. This should be compared with known arrangements where only 7° can be sensed and recorded. A sensor 63 is also provided which senses the home position of the rack 19 in order to indicate the home position of the saw bar 3. One of the two sensors 61, 62, may be omitted if information concerning the direction of movement of the saw bar is unnecessary. In certain cases it is sufficient if said gear ratio is 1.5:1 or more.

The saw box 13 has a top plate 71 and a bottom plate 72 which are parallel with the saw bar 3 and connected to each other by means of a rear plate 73. The saw box 13 is open at its side facing away from the rear plate 73 in order to permit the saw bar 3 to be fed out. The saw box 13 is mounted on the saw assembly with the aid of the top plate 71. The bottom plate 72 is spaced from the saw bar 3 so that a gap is formed between them. The free edge 74 of the top plate has an inwardly running, arc-shaped extension or concave shape, the bottom area 75 of the inward curve lying approximately opposite the middle of the length of the saw bar 3. As can be seen more clearly in FIG. 7, the tree is received within this bottom area 75 of the inward curve.

The saw assembly is equipped with a device 76 for supply of a functional marking liquid to one of the cut surfaces 77 obtained at each sawing operation. The liquid supply device 76 comprises at least one nozzle 78, arranged in a holder 79 which is screwed firmly to the inside of the bottom plate 72 of the saw box. Three nozzles 78 are used in the embodiment shown, and are arranged in the common holder 79. The holder 79 is fitted in such a way that the nozzles 78 are situated at a fixed predetermined distance from the tree 80, measured at the starting point or commencement of the saw cut 81 to be executed, when the gripping claws 70 encompass the tree 80 and press this against the top plate 71 of the saw box 13. The saw bar 3 is thus movable in relation to the nozzle 78 and saw box 13, the nozzles 78 being stationary in relation to the saw box 13. Said predetermined distance is about 160–180 mm, preferably about 170 mm. The nozzles 78 are directed towards an imagined peripheral curve of the tree 80 within which the bar commences sawing at said saw cut 81. The invention makes use of the space 82 formed between the saw bar 3 and each cut surface 77 by the saw chain 4 producing a groove 81 which is wider than the thickness of the saw bar. When the saw bar 3 has sawn to a depth substantially corresponding to the width of the saw bar 3, the liquid supply device 76 receives a signal to feed out the relevant liquids which, in the form of jets 83 from the nozzles 78, are directed towards the saw bar at an acute angle α so that each liquid jet 83 is deflected into said space 82 to encounter the cut surface 77 close to its periphery or a short distance in on the cut surface 77, depending on the angle of incidence α of the liquid jet 83 to the saw bar. Experiments have shown that a suitable angle α is 29°. The liquid jet 83 produces a marking on the cut surface 77 that is situated 0–50 mm, preferably approximately 40 mm from the periphery of the cut surface 77.

Each nozzle 78 is connected to an outer container 84 for different function liquids via a connection comprising a pipe 85 provided with a pump 86 and extending to the saw box 13.

The functional liquids currently applicable, i.e. that satisfy modern forestry demands, contain active components to produce colour coding or colourless marking of the log to indicate its type and/or quality, for instance. A colour marking can be read visually and/or optically with a colour reader, while a colourless marking is read optically with an automatic reader or bar code reader. The operator selects the desired colour or colours from a computer-aided program selection system, these colours identifying the type of tree for instance, e.g. spruce or pine, and the kind of log, e.g. timber. The same applies to the choice of desired colourless liquid. Start and stop signals for the supply of liquid are controlled with the aid of electronic signals from a control device with an electronic sensor system comprising said sensors 61 or 62 which sense the angle of the bar holder 2 in relation to the stand 1, and a sensor on the gripping arms 70, for instance, which senses the diameter of the tree. Thanks to said tooth arrangement with the rack 19 and the two toothed wheels 26, 60 with large gear ratio, the sensor system can sense extremely small angular movements of the bar 3, i.e. as small as 2°, and the supply of liquid can thus be initiated at the right moment, i.e. at the correct position of the bar in the first part of the saw cut, so that the liquid encounters the bar 3 in the correct position in relation to the tree 80 and is deflected in towards the cut surface 77. In other words, the liquid is aimed with extremely great precision towards the cut surface 77.

What is claimed is:

1. A saw assembly for a grip-harvester, comprising:

a stand;

a bar;

a chain sprocket;

a saw chain running around said bar and said chain sprocket;

a bar holder pivotably journalled on said stand;

a saw motor driving said chain sprocket;

a hydraulic cylinder mounted on said stand and having a piston rod and a connection to said bar holder so as to move said bar in and out to perform a sawing operation;

a liquid supply device for supplying at lest one functional marking liquid to a cut surface produced during a sawing operation, said liquid supply device comprising at least one nozzle mounted with a holder and so directed that a liquid jet from said nozzle encounters an opposing side surface of said bar at an acute angle α and is deflected in towards said cut surface in a space between said bar and said cut surface;

gripping claws for encompassing a tree;

said nozzle and nozzle holder mounted inside said saw box, so that said nozzle is held at a fixed predetermined distance from a tree measured at said start of said saw cut to be executed when said gripping claws are positioned to encompass a tree and press said tree against said free edge of said top plate of said saw box; and control means for initiating a supply of a liquid jet from said nozzle when said bar has been inserted a predetermined distance into said tree.

2. A saw assembly as claimed in claim 1 wherein said angle α is between 20° and 40°.

3. A saw assembly as claimed in claim 1 wherein said angle α is between 25° and 35°.

4. A saw assembly as claimed in claim 1 wherein said angle α is between 29° and 31°.

5. A saw assembly as claimed in claim 1 wherein the liquid jet produces a marking in the cut surface which is located 0–50 mm from the periphery of the cut surface.

6. A saw assembly as claimed in claim 1, wherein said connection comprises a first toothed wheel pivotably journalled in said stand, and coaxially, rigidly joined to said bar holder, at least a sector of a first toothed wheel rim mounted level with and facing said piston rod and level with and facing said piston rod; and wherein said piston rod includes a rack with teeth facing said first toothed wheel and in engagement with said teeth on said at least a sector of said rim; and further comprising a device for sensing and recording the angular position of said saw bar in relation to an initial position, said sensing and recording device comprising a second toothed wheel which is smaller than and is in toothed engagement with said first toothed wheel so that a gear ratio of >1 is obtained, said sensing and recording device including at least one sensor which, in an initial position of said saw bar, is positioned immediately opposite a gap between two teeth or immediately opposite a tooth in said second toothed wheel.

7. A saw assembly as claimed in claim 6 wherein said sensing device also senses and records the direction of movement of said saw bar, said sensing and recording device comprising two sensors one of which in an initial position of said saw bar is positioned immediately opposite a gap between two teeth, and the other immediately opposite a tooth on said second toothed wheel.

8. A saw assembly as claimed in claim 7 wherein the gear ratio between said first and second toothed wheels is greater than 1.5:1.

9. A saw assembly as claimed in claim 6 wherein the gear ratio between said first and second toothed wheels is greater than 1.5:1.

10. A saw assembly as claimed in claim 6 wherein the gear ratio between said first and second toothed wheels is greater than 3:1.

11. A saw assembly as claimed in claim 7 wherein the gear ratio between said first and second toothed wheels is greater than 3:1.

12. A saw assembly as claimed in claim 6 further comprising a bearing positioned within the axial extension of said first toothed wheel to permit turning of said bar holder.

13. A saw assembly as claimed in claim 1 wherein said saw box has a bottom plate, and wherein said nozzle holder is mounted on the inside of said bottom plate of said saw box.

14. A saw assembly as claimed in claim 1 wherein said at least one nozzle comprises three nozzles for supplying different marking liquids to produce differently colored or otherwise visually or optically readable different markings at separate points on the cut surface.

15. A saw assembly as claimed in claim 1 wherein said predetermined distance between said at least one nozzle and the saw cut is about 160–180 mm.

16. A saw assembly as claimed in claim 1 wherein the liquid jet produces a marking in the cut surface which is located 40 mm from the periphery of the cut surface.

17. A saw assembly as claimed in claim 1 wherein said predetermined distance between said at least one nozzle and the saw cut is about 170 mm.

18. A saw assembly as claimed in claim 2, wherein said connection comprises a first toothed wheel pivotably journalled in said stand, and coaxially, rigidly joined to said bar holder, at least a sector of a first toothed wheel rim mounted level with and facing said piston rod and level with and facing said piston rod; and wherein said piston rod includes a rack with teeth facing said first toothed wheel and in engagement with said teeth on said at least a sector of said rim; and further comprising a device for sensing and recording the angular position of said saw bar in relation to an initial position, said sensing and recording device comprising a second toothed wheel which is smaller than and is in toothed engagement with said first toothed wheel so that a gear ratio of >1 is obtained, said sensing and recording device including at least one sensor which, in an initial position of said saw bar, is positioned immediately opposite a gap between two teeth or immediately opposite a tooth in said second toothed wheel.

19. A saw assembly as claimed in claim 18 wherein the liquid jet produces a marking in the cut surface which is located 0–50 mm from the periphery of the cut surface.

20. A saw assembly as claimed in claim 19 wherein said predetermined distance between said at least one nozzle and the saw cut is about 160–180 mm.

* * * * *